United States Patent [19]

Young, Jr. et al.

[11] 4,146,955
[45] Apr. 3, 1979

[54] METHOD OF FABRICATING A STEPPED-ARRAY ACOUSTO-OPTIC BEAM DEFLECTOR

[75] Inventors: Eddie H. C. Young, Jr., Indialantic, Fla.; Shi-Kay Yao, Brea, Calif.

[73] Assignee: Harris Corporation, Melbourne, Fla.

[21] Appl. No.: 824,739

[22] Filed: Aug. 15, 1977

[51] Int. Cl.² .................................. H04R 31/00
[52] U.S. Cl. .................................. 29/594; 29/416; 350/358
[58] Field of Search .............. 29/594, 416; 350/358; 250/199

[56] References Cited

U.S. PATENT DOCUMENTS

| | | | |
|---|---|---|---|
| 3,493,759 | 2/1970 | Adler | 350/358 X |
| 3,771,856 | 11/1973 | Eschler | 350/358 |
| 3,798,746 | 3/1974 | Alphonse et al. | 29/594 X |
| 3,944,335 | 3/1976 | Saito et al. | 350/358 |
| 4,037,933 | 7/1977 | Yano et al. | 350/358 |

Primary Examiner—Carl E. Hall
Attorney, Agent, or Firm—Craig & Antonelli

[57] ABSTRACT

A method of fabricating a stepped-array acousto-optic beam deflector comprising the steps of providing a substrate having upper and lower surfaces lying in mutually oblique planes, forming an electro-acoustic transducer on the upper substrate surface, cutting through the substrate and the upper and lower surfaces to form a plurality of disjoined transducer elements positioned side by side, and mounting the disjoined transducer elements in tandem to an acousto-optic element.

9 Claims, 8 Drawing Figures

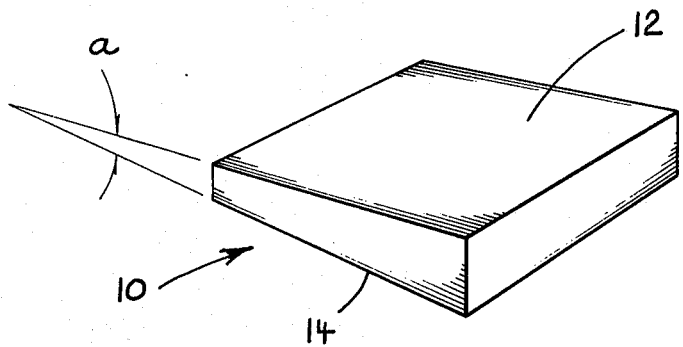
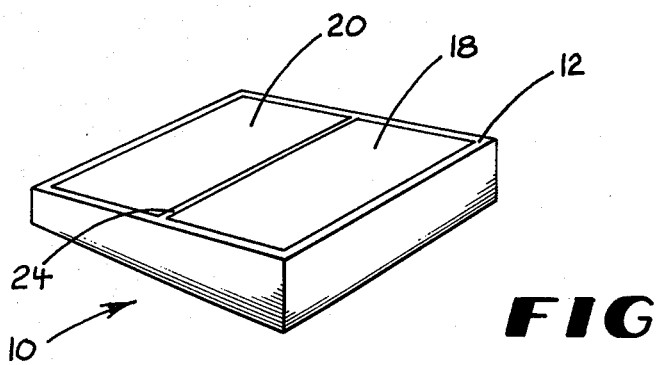
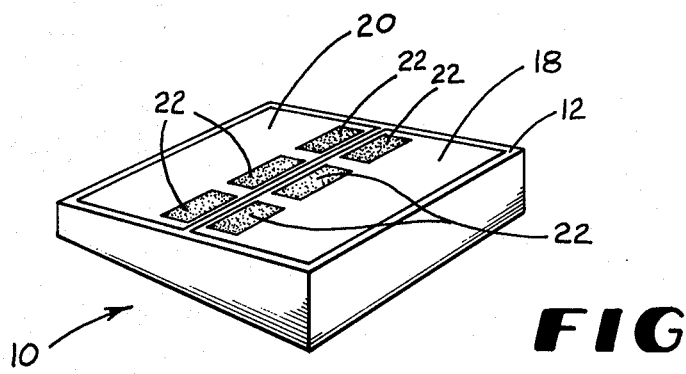
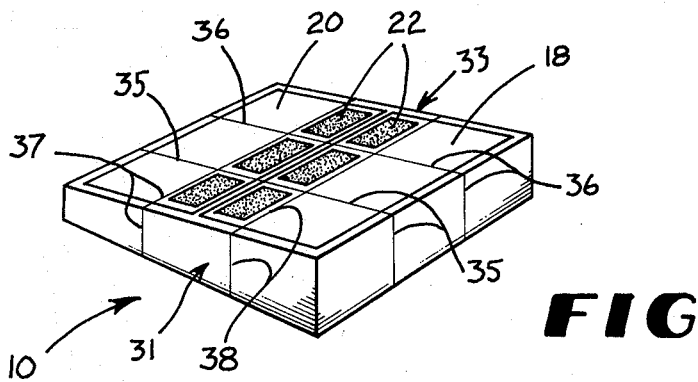

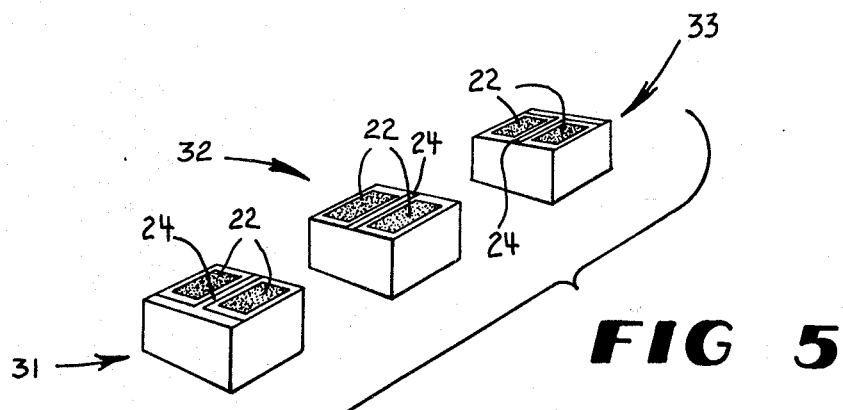
FIG 5
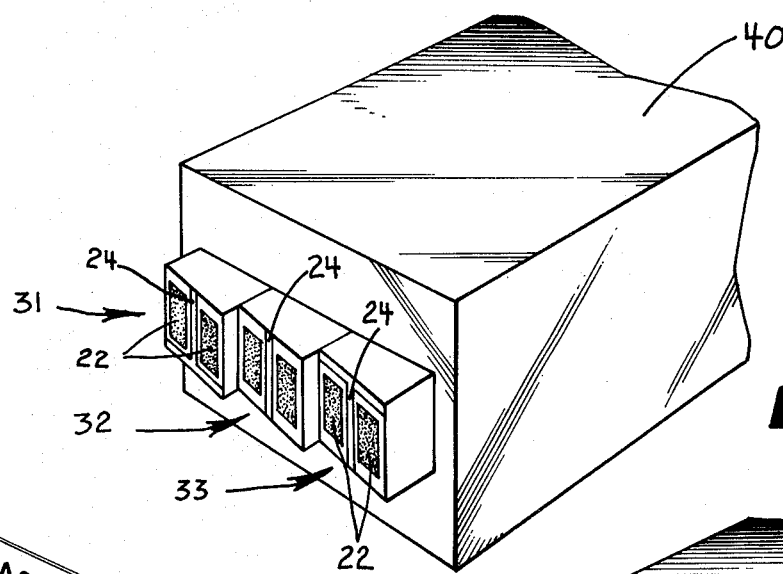
FIG 6
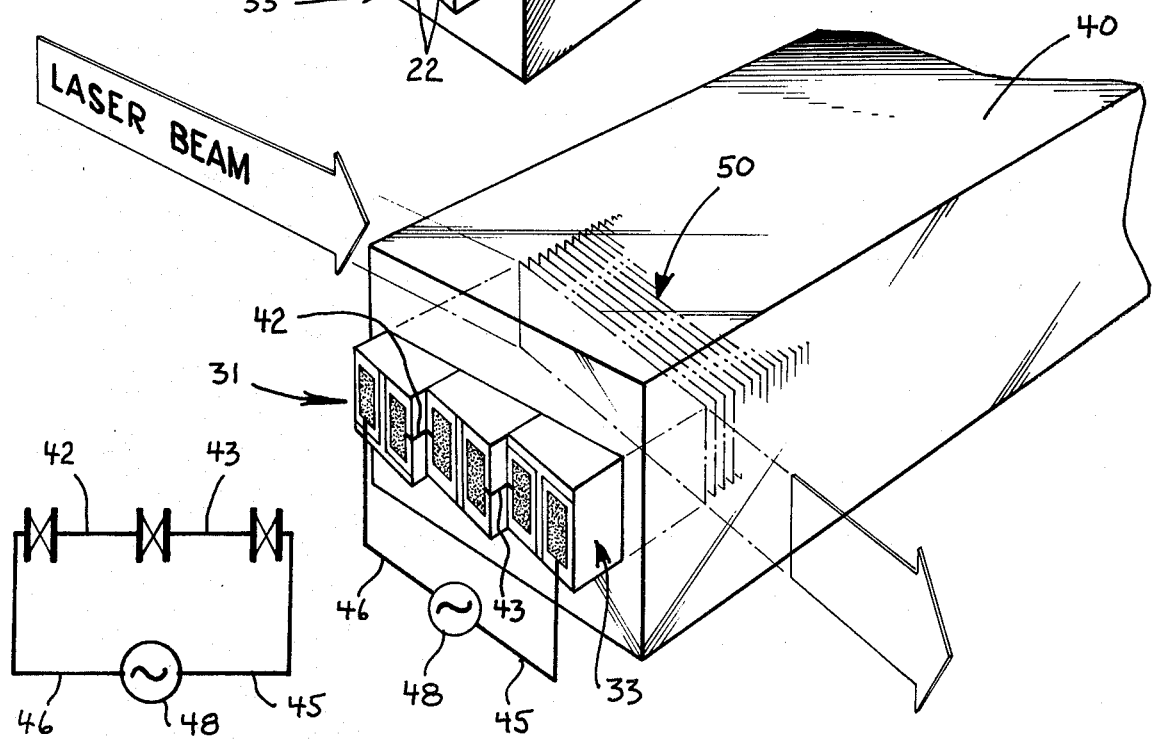
FIG 8
FIG 7

METHOD OF FABRICATING A STEPPED-ARRAY ACOUSTO-OPTIC BEAM DEFLECTOR

BACKGROUND OF THE INVENTION

This invention relates generally to acousto-optic beam deflectors, and particularly to methods of fabricating acousto-optic beam deflectors of the type employing a stepped-array of transducers.

In the article entitled "Interaction Between Light and Sound," By Robert Adler, which appeared in the May 1967 issue of IEEE SPECTRUM, an acousto-optic beam deflector was proposed utilizing the Bragg reflection phenomenon. According to this principle a spatially-coherent, substantially monochromic light beam incident upon sound waves at a particular angle, which depends upon the wavelength of the light and sound, is defracted by the sound wave at this same angle. In other words, when light and sound interact at the Bragg angle the traveling sound waves act as if they were moving mirrors. Thus by altering the direction of sound wave propagation, a beam of coherent light incident upon the traveling sound waves may itself be deflected.

In order to maintain the proper Bragg angle relationship it is necessary to accompany changes in direction of sound propagation with changes in sound frequencies. A device which accomplishes this with both a sizable interaction area and frequency bandwidth is that known as an echelon or steppedarray acousto-optic beam deflector. This type beam deflector, as exemplified by that disclosed in U.S. Pat. No. 3,493,759, has heretofore comprised a series of individual transducers mounted upon a series of steps formed in a glass element affixed to an end of a light-sound interaction cell with each step offset from the next adjacent step by distance equal to half the wavelength of the sound employed at center frequency.

This type of beam steering device has the attribute of providing an acousto-optic interaction length which can be increased without sacrifice in bandwidth. Therefore, less power may be required in its operation for a given efficiency. Increase in interaction length also increases the cross-section of the acoustic beam which further reduces power density. Once fabricated, stepped-array acousto-optic beam deflectors have performed quite satisfactorily. Fabrication has been a limiting factor however due to the extremely small dimensions of the steps. Thus, the bonding, grinding, polishing and electroding required has made their formation quite tedious and costly.

Accordingly, it is a general object of the present invention to provide an improved method of fabricating a stepped-array acousto-optic beam deflector.

More specifically, it is an object of the invention to provide a method of fabricating a stepped-array acousto-optic beam deflector which does not mandate the formation of steps in situ upon a unitary element.

Another object of the invention is to provide a method of fabricating a stepped-array acousto-optic beam deflector with improved facility, accuracy and cost efficiency.

SUMMARY OF THE INVENTION

In one form of the invention a method is provided for fabricating a stepped-array acousto-optic beam deflector wherein a substrate having upper and lower surfaces lying in mutually oblique planes is provided, an electro-acoustic transducer is formed on the upper substrate surface, and the substrate and its upper and lower surfaces are cut through to form a plurality of disjointed transducer elements positioned side by side. The disjoined transducer elements are then mounted in tandem to an acousto-optic element with the upper substrate surface disposed distal the acousto-optic element.

In another form of the invention a method is provided for fabricating a stepped-array acousto-optic beam deflector wherein a wedge-shaped substrate is provided, a pair of electro-acoustic transducers is formed on a principal surface of the wedge-shaped substrate, and the substrate divided longitudinally into a plurality of disjointed wedge-shaped elements each having a pair of the formed electro-acoustic transducers thereon. The disjointed wedge-shaped elements are then mounted in tandem to an acousto-optic element with the principal substrate surfaces located distal the acoustic-optic element.

BRIEF DESCRIPTION OF THE DRAWING

FIGS. 1–4 are a sequence of perspective views illustrating steps in the formation of a set of transducer elements in accordance with principles of the invention.

FIG. 5 is a perspective view of three disjoined transducer elements fabricated by the sequence of steps shown in FIGS. 1–4.

FIG. 6 is a perspective view of the three disjoined transducer elements illustrated in FIG. 5 shown mounted in tandem to a light-sound interaction cell.

FIG. 7 illustrates a completed stepped-array acousto-optic beam deflector fabricated by the steps shown in FIGS. 1–6.

FIG. 8 is an electronic circuit diagram of the stepped-array acousto-optic beam deflector illustrated in FIG. 7.

DESCRIPTION OF THE PREFERRED EMBODIMENT

Referring now in more detail to the drawing, there is shown in FIG. 1 a generally wedge-shaped substrate 10 having an upper principal surface 12 and a lower principal surface 14 inclined thereto an angle a which here approximates 2°. This angle a is given by a ≃ Λ/d, where Λ is the acoustic wavelength at the center frequency and d is the element spacing defined in FIG. 4. Each principal surface here measures ¾ inches by ¾ inches. The substrate is preferably formed of a leaded glass such as flint glass although quartz, sapphire, lithium niobate or other materials having an acoustic impedence similar to that of the transducer elements to be formed thereon may be employed. Preferably the impedence should be from 0.5 to 1.5 that of the transducer. The wedge-shaped substrate here may be formed by grinding with an abrasive wheel followed by polishing.

Once the substrate has been formed two flat lithium niobate electro-acoustic transducers 18 and 20 are bonded to its upper principal surface 12. Alternatively, the substrate may be ground to its wedge-shaped configuration after the transducers have been affixed. The transducers are bonded to the upper principal surfaces 12 of the wedge-shaped substrate leaving a gap 24 therebetween by evaporating a metal alloy such as indium-gold-chrome onto the substrate and then pressure bonding the transducers to the alloy. Following this six mutually spaced metallic strip electrodes 22 are formed atop the upper surfaces of the transducers with three being formed upon transducer 18 and three opposite gap 24 upon electrode 20 as shown in FIG. 3.

Next, three disjointed transducer elements 31, 32 and 33 are formed from the structure shown in FIG. 3 by cutting it as with a saw. In performing this two parallel cuts 35 and 36 are seen to be made between adjacent pairs of the electrodes transversing gap 24, and two other mutually parallel cuts 37 and 38 are made at right angles thereto along the outwardly facing edges of electrodes 22 as shown in FIG. 4. Upon making these cuts and discarding the superfluous structures which do not bear electrodes the three transducer elements 31, 32 and 33 so formed have the mutual side by side orientation shown in FIG. 5. Some spacing therebetween is shown here for clarity.

Next the three disjoined elements 31, 32 and 33 are assembled in tandem with transducer gaps 24 now mutually parallel instead of coextensive. Now in tandem they are secured to a conventional light-sound interaction cell 40 such as one composed of PbMoO$_4$ as shown in FIG. 6. Again, this may be done by evaporating metal alloy of the type previously described onto the cell and then pressure bonding each of the disjoined transducer elements onto the alloy with adjacent sides of the transducer elements being mounted flush against one another. As shown in FIG. 6, the transducer elements now reassembled in this new formation collectively form a stepped-array of transducer elements. This is seen to have been accomplished without having to form the steps with their minute rises to situ by grinding or the like. Finally, adjacent electrodes of adjacent transducer elements are electrically coupled by connectors 42 and 43 and the end electrodes coupled by connectors 45 and 46 to a signal source 48. This forms the electronic circuit schematically illustrated in FIG. 8. The beam deflector may now be placed in the path of a laser beam as shown in FIG. 7 for deflection off of sound waves 50 propagating from the transducers through cell 50 in controlling the direction of the laser beam.

We thus see that a method of fabricating a stepped-array acousto-optic beam deflector is provided which may be practiced with facility, accuracy and without substantial cost. With this method it is possible to construct deflectors of substantial bandwidth such as up to approximately 350 MHz with substantial flexibility in interaction medium selection. Typical parameters of beam deflectors constructed by this method have been 50% defraction efficiency at 750 mW rf drive power, up to 250 MHz 3 db bandwidth, and 2 mm by 30 mm optical aperture with PbMoO$_4$ interaction cells.

It should be understood that the just described embodiment merely illustrates principles of the invention in one preferred form. Many modifications, additions, and deletions may, of course, be made thereto without departure from the spirit and scope of the invention as set forth in the concluding claims. For example, step sequencies may be altered such as previously mentioned with regard to the formation of the substrate shape. The electrodes may be applied in elongated strips and then disjoined by the cutting operations. Conversely, the transducers may be distinctly formed in situ rather than subsequently disjoined by the cutting operation.

We claim:

1. A method of fabricating a stepped-array acousto-optic beam deflector comprising the steps of:
    (a) providing a substrate having upper and lower surfaces lying in mutually oblique planes;
    (b) forming an electro-acoustic transducer on the upper substrate surface;
    (c) cutting through the substrate and the upper and lower substrate surfaces to form a plurality of disjoined transducer elements positioned side by side; and
    (d) mounting the disjoined transducer elements in tandem to an acousto-optic element with the upper substrate surfaces disposed distal the acousto-optic element.

2. The method of fabricating a stepped-array acousto-optic beam deflector in accordance with claim 1 wherein step (b) a pair of mutually spaced electro-acoustic transducers are formed on the upper substrate surface, and wherein step (c) the pair of mutually spaced electro-acoustic transducers are cut whereby each disjoined transducer element is formed with a pair of electro-acoustic transducers.

3. The method of fabricating a stepped-array acousto-optic beam deflector in accordance with claim 1 wherein a plurality of mutually spaced electrodes are formed on the electro-acoustic transducer prior to step (c), and wherein step (c) the substrate is cut between the mutually spaced electrodes.

4. The method of fabricating a stepped-array acoustic-optic beam deflector in accordance with claim 1 wherein step (d) the disjoined transducer elements are mounted in tandem flush against one another to the acoustic-optic element.

5. The method of fabricating a stepped-array acoustic-optic beam deflector in accordance with claim 1 wherein steps (a) through (d) are performed sequentially.

6. A method of fabricating a stepped-array acousto-optic beam deflector comprising steps of:
    (a) providing a wedge-shaped structure;
    (b) forming a pair of electro-acoustic transducers on a principal surface of the wedge-shaped substrate;
    (c) dividing the substrate longitudinally into a plurality of disjoined wedge-shaped elements each having a pair of the electro-acoustic transducers thereon; and
    (d) mounting the disjoined wedge-shaped elements in tandem to an acoustic-optic element with said principal substrate surface located distal the acoustic-optic element.

7. The method of fabricating a stepped-array acoustic-optic beam deflector in accordance with claim 6 wherein a plurality of mutually spaced electrodes are formed on each of the electro-acoustic transducers prior to step (c), and wherein step (c) the substrate is divided longitudinally into a plurality of disjoined wedge-shaped elements with each having a pair of the formed electro-acoustic transducers thereon and with each electro-acoustic transducer bearing one of the formed electrodes.

8. The method of fabricating a stepped-array acoustic-beam deflector in accordance with claim 6 wherein step (d) the disjoined wedge-shaped elements are mounted in tandem flush against one another to the acoustic-optic element.

9. The method of fabricating a stepped-array acoustic-optic beam deflector in accordance with claim 6 wherein steps (a) through (d) are performed sequentially.

* * * * *